United States Patent
Homelvig et al.

(10) Patent No.: US 10,267,345 B2
(45) Date of Patent: Apr. 23, 2019

(54) SPLICE JOINT COMPONENT AND ASSOCIATED NUT CAPTURE ARRANGEMENT

(71) Applicant: CONTECH ENGINEERED SOLUTIONS LLC, West Chester, OH (US)

(72) Inventors: Adam K. Homelvig, Alexandria, MN (US); Bruce A. Corneliusen, Alexandria, MN (US); Kevin W. Gades, Alexandria, MN (US)

(73) Assignee: CONTECH ENGINEERED SOLUTIONS LLC, West Chester, OH (US)

( * ) Notice: Subject to any disclaimer, the term of this patent is extended or adjusted under 35 U.S.C. 154(b) by 527 days.

(21) Appl. No.: 15/061,547

(22) Filed: Mar. 4, 2016

(65) Prior Publication Data

US 2016/0281755 A1    Sep. 29, 2016

Related U.S. Application Data

(60) Provisional application No. 62/138,610, filed on Mar. 26, 2015.

(51) Int. Cl.
    *F16B 7/18*     (2006.01)
    *F16B 39/10*    (2006.01)

(52) U.S. Cl.
    CPC ............. *F16B 7/18* (2013.01); *F16B 39/101* (2013.01)

(58) Field of Classification Search
    CPC .. Y10T 403/55; Y10T 403/553; F16B 7/0413; F16B 7/0446; F16B 7/04; F16B 7/0406; F16B 39/10; F16B 39/101; F16B 2200/50; F16B 2200/503; F16B 2200/506
    See application file for complete search history.

(56) References Cited

U.S. PATENT DOCUMENTS

| | | |
|---|---|---|
| 536,711 A | 4/1895 | Vyne |
| 588,661 A | 8/1897 | Schweitzer |
| 625,493 A | 5/1899 | Duty |
| 694,178 A | 2/1902 | Norman |
| 733,915 A | 7/1903 | Pike |
| 848,737 A | 4/1907 | Golden |

(Continued)

FOREIGN PATENT DOCUMENTS

| | | | | |
|---|---|---|---|---|
| DE | 198 41 314 | * | 4/2000 | ................ F16B 7/06 |
| FR | 2 414 655  | * | 8/1979 | ................ F16B 7/18 |

OTHER PUBLICATIONS

Admitted Prior Art.

*Primary Examiner* — Michael P Ferguson
(74) *Attorney, Agent, or Firm* — Thompson Hine LLP

(57) ABSTRACT

A splice component for tubular members includes a splice plate having a linear arrangement of spaced apart openings extending along a length of the splice plate, and a plurality of nuts aligned with the splice plate openings and loosely retained in place by a nut capture arrangement. The nut capture arrangement is formed at least in part by an elongated U-shaped cover plate having spaced apart side support legs on opposite sides of the linear arrangement openings, and a bridging part extending between the spaced apart side support legs and over the linear arrangement of openings. At least one elongated retaining plate extends between and is fixed to the spaced apart side support legs.

16 Claims, 2 Drawing Sheets

(56) References Cited

U.S. PATENT DOCUMENTS

| | | | | |
|---|---|---|---|---|
| 896,578 | A * | 8/1908 | Richards | F16B 39/101 |
| | | | | 411/96 |
| 937,295 | A * | 10/1909 | Faulkner | F16B 39/101 |
| | | | | 411/95 |
| 969,655 | A | 9/1910 | Poirier | |
| 1,008,959 | A | 11/1911 | Davin | |
| 1,063,853 | A | 6/1913 | Carpenter | |
| 1,081,741 | A | 12/1913 | Hipsley | |
| 1,427,566 | A | 8/1922 | Wear et al. | |
| 1,524,693 | A | 5/1923 | Dickerson | |
| 1,798,591 | A | 3/1931 | Crawford | |
| 8,468,775 | B2 * | 6/2013 | Vaughn | E02D 27/34 |
| | | | | 403/200 |
| 2010/0044524 | A1 | 2/2010 | Sugaya et al. | |

* cited by examiner

SPLICE JOINT COMPONENT AND ASSOCIATED NUT CAPTURE ARRANGEMENT

TECHNICAL FIELD

This application relates generally to splice arrangements for interconnecting tubular members and, more specifically, to a splice component incorporating a nut capture arrangement.

BACKGROUND

Many structures, such as bridges, buildings and frames, are built using structural metal tubes. In many case the metal tubes need to be connected end to end to achieve a desired configuration. One option is to weld metal tubes that are connected end to end, but that operation is time consuming and difficult to perform in certain construction environments. Accordingly, splice plate assemblies have been used in the past to interconnect metal tubulars in an end to end fashion. One example utilizes nuts welded onto the splice plate, but this arrangement does not maintain the nut in place if the weld connection fails, which is against code in some areas. Arrangements to better capture the nuts in position on the splice plate have been used, but existing splice plate assemblies also have problems, including difficulties in the manufacture, assembly and/or installation of the splice plate components.

Improvements in the manufacturability, ease of in-field installation and/or performance are still sought.

SUMMARY

In one aspect, a splice component for joining metal tubular members end to end includes a splice plate, a plurality of nuts and a nut capture arrangement, where the nut capture arrangement is formed by at least one elongated U-shaped cover plate.

In another aspect, a splice component for joining metal tubular members end to end includes a splice plate having a linear arrangement of spaced apart openings extending along a length of the splice plate, and a plurality of nuts, each nut adjacent to and aligned with a respective one of the openings in the splice plate and loosely retained in place by a nut capture arrangement. The nut capture arrangement is formed by at least one elongated U-shaped cover plate and at least one elongated retaining plate. The elongated U-shaped cover plate includes spaced apart side support legs on opposite sides of the linear arrangement of spaced apart openings and a bridging part extending between the spaced apart side support legs and over the linear arrangement of spaced apart openings and the nuts aligned with the spaced apart openings. The elongated retaining plate extends between and is fixed to the spaced apart side support legs. The elongated retaining plate includes a plurality of nut openings located therein, the elongated retaining plate positioned between the splice plate and the bridging part. The elongated retaining plate is positioned at a location that is spaced apart from both the splice plate and the bridging part and along a thickness of the nuts such that each nut includes an intermediate portion within a respective one of the openings of the retaining plate, a first end portion to one side of the retaining plate and a second end portion to an opposite side of the retaining plate. Each nut is and its respective opening are cooperatively configured to inhibit rotation of the nut within the opening while permitting some movement of the nut relative to its respective opening in the splice plate.

The details of one or more embodiments are set forth in the accompanying drawings and the description below. Other features, objects, and advantages will be apparent from the description and drawings, and from the claims.

DETAILED DESCRIPTION

Figure 1:
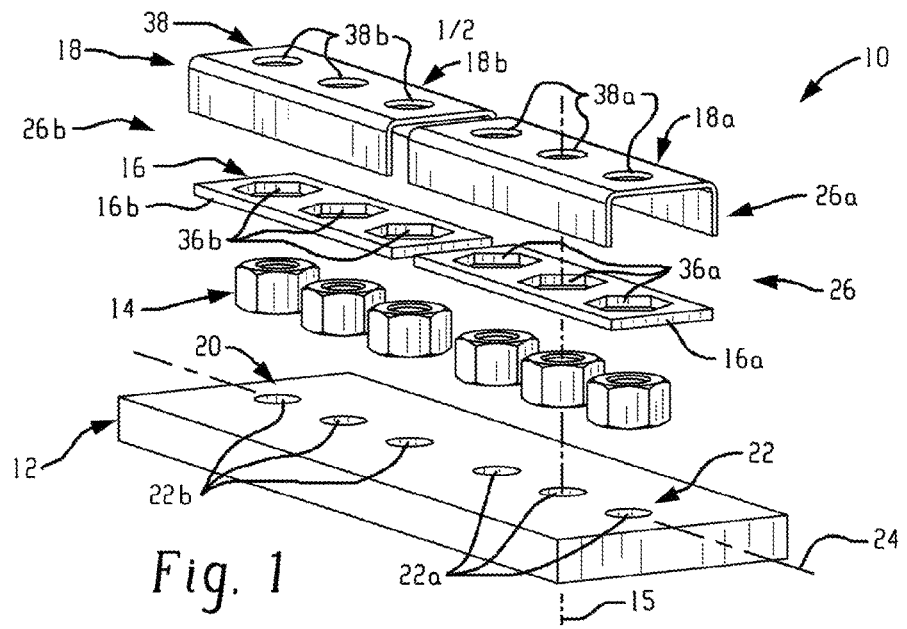
FIG. 1 is an exploded view of one embodiment of a splice component.
Figure 2:
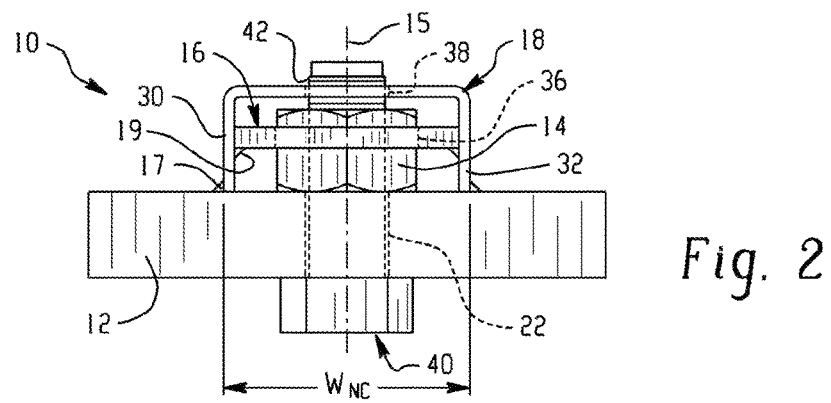
FIG. 2 is an end elevation of the splice component of FIG. 1 when assembled.

Referring to FIGS. 1 and 2, a splice component 10 useful for joining metal tubular members end to end is shown. The splice component includes a splice plate 12, a plurality of nuts 14, one or more nut retaining plates 16 (here two plates 16a, 16b) and one or more nut cover plates 18 (here two plates 18a, 18b). The splice plate 12 acts as the structural member that will bridge the gap between two end-to-end tubular members (e.g., steel tubular members, though other metals may be used). The splice plate may, for example, be formed of as a steel plate that is of a thickness and length suitable for the particular application. The splice plate 12 includes a linear arrangement 20 of spaced apart openings 22, typically extending along or parallel to a lengthwise axis 24 of the splice plate. In the illustrated embodiment, two sets of openings 22a and 22b make up the linear arrangement 20, where the openings of each set are equally spaced apart, but a spacing between the two sets is slightly greater than the spacing between the openings in a set. However, other variations are possible. By way of example, the openings may be ½ inch to 1 inch in diameter, though other sizes are possible as well.

As suggested by representative alignment axis 15, each nut 14 is adjacent to and aligned with a respective one of the openings 22 in the splice plate 12 so that a bolt 40 can be passed through each splice plate opening 22 and threaded into the nut 14. A goal of the splice component is to create a prefabricated assembly that holds the nuts 14 in place adjacent the respective splice plate openings 22, while at the same time facilitating ease of make-up between the bolts 40 and the nuts 14. Accordingly, the nuts 14 are loosely retained in place by a nut capture arrangement 26 formed by the retaining plate 16 and cover plate 18. In the illustrated embodiment per FIG. 1, two assemblies 26a, 26b make up the nut capture arrangement, one for capturing the nuts aligned with each opening set 22a, 22b, and each arrangement formed by respective plate and cover pairs 16a, 18a and 16b, 18b. However, in other embodiments a single long assembly might be used.

Each cover plate 18 is formed as an elongated U-shaped cover plate having spaced apart side support legs 30, 32 on opposite sides of the linear arrangement of spaced apart openings and a bridging part 34 extending between the spaced apart side legs. The bridging part 34 extends over both the linear arrangement of spaced apart openings and the nuts 14 aligned with the openings. In one desirable example each U-shaped cover plate is formed by a metal plate roll-formed into the U-shape so as to be a monolithic piece. Each retaining plate 16 is formed as an elongated retaining plate that extends between, and is fixed to, the spaced apart side support legs 30 and 32. Each elongated retaining plate 16 includes a plurality of nut openings 36 (e.g., 36*a*, 36*b* in the case of the two plates) located therein. As best seen in FIG. 2, each elongated retaining plate 16 is positioned between the splice plate 12 and the bridging part 34 and at a location that is spaced apart from both the splice plate 12 and the bridging part 34. Each splice plate 16 is located along a thickness of the nuts 14 such that each nut 14 includes an intermediate portion within a respective one of the plate openings 36 of the retaining plate, one end portion to one side of the retaining plate 16 (e.g., here the top end portion of the nut between the retaining plate 16 and bridging part 34) and another end portion to an opposite side of the retaining plate 16 (e.g., here the bottom end portion of the nut between the retaining plate 16 and the splice plate 12).

As shown, each nut 14 and its respective retaining plate opening 36 are cooperatively configured (here using respective hex shapes) to inhibit rotation of the nut 14 within the opening 36 while permitting some movement of the nut 14 relative to its respective retaining plate opening (e.g., the size of the hex shape of the retaining plate openings 36 is slightly larger than the size of the hex shape of the nuts 14). This configuration allows each nut 14 to move slightly as needed for alignment with the end of a bolt 40 that is passed through the splice opening 22 for threading into the nut 14.

Each side leg 32, 34 of each U-shaped cover plate 18 may be welded to the surface of the splice plate 12 (e.g., as per one or more fillet welds 17), and the opposed side edges of each elongated retaining plate 16 may each be welded to the inner surface of a respective one of the side legs 32, 34 of the U-shaped cover plate 18 (e.g., per one or more fillet welds 19). The nuts 14 are thus loosely captured in alignment with the splice plate openings 22 in a manner that prevents the nuts 14 from being removed from the assembly, thereby assuring the presence of the nuts 14 when the splice component is used to make a tubular splice.

In one example, a thickness of each elongated retaining plate 16 is at least fifty percent greater than a thickness of the material of the U-shaped cover plate 18. The U-shaped cover plate can typically be made of thinner material because it is primarily the retaining plate 16 that must deal with and be capable of handling the forces that occur as a bolt 40 is torqued into a nut 14.

The splice component 10 may be a prefabricated assembly that is shipped to a construction site (either separately or with the tubular members to be spliced). Accordingly, the splice bolts 40 may be threaded into the component for the purpose of shipment if desired, in which case the bolts 40 would need to be removed before making up a splice. Notably, the bridging part 34 of each U-shaped cover plate 18 includes a linear arrangement of spaced apart openings 38 (here two sets of openings 38*a*, 38*b*), each opening 38 aligned with a respective one of the openings 36 of the splice plate 12, as well as a respective one of the nuts 14 and openings 36 in the retaining plate 16. Each bolt 40 extends through a respective one of the openings 22 in the splice plate and is threaded into the nut 14 aligned with the opening. Each bolt 40 may have a distal end 42 that passes at least partially through a respective one of the openings 38 in the bridging part 34 of the U-shaped cover plate, as suggested in FIG. 2. This positioning of the distal end of the bolt may also occur after splice formation, though less pronounced due to the thickness of the tubular member being spliced.

It is also recognized that the splice bolts 40 may be shipped in a separate package with the splice plate assemblies, or may be shipped or supplied separately.

Figure 3:
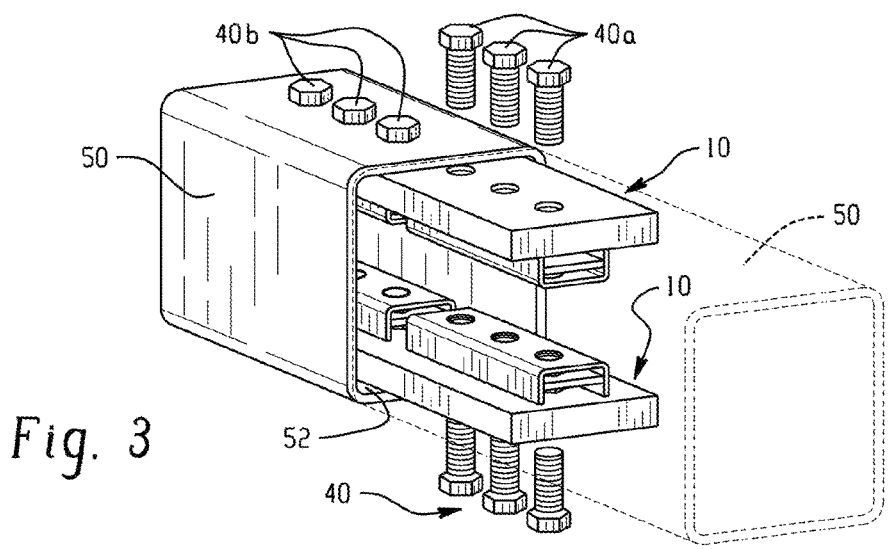
FIG. 3 is a partial perspective view of a tubular splice joint formed using the splice component of FIG. 1.

Referring primarily to FIG. 3, a tubular splice joint may typically be formed using one or more splice components 10 (e.g., in this case two). Each tubular member 50 (one of which is shown as solid and one of which is shown in dashed line transparent form in FIG. 3) has an open end 52, and the open ends are aligned for the purpose of the splice. The tubular members 50 of FIG. 3 are shown relatively short in length, but typically would be much longer. One end portion of each splice component 10 is positioned within the open end of one of the tubular members, with the splice plate adjacent an inner surface of that tubular member, and the opposite end portion of each splice component is positioned with the open end of the other tubular member, with the splice plate adjacent an inner surface portion of that other tubular member. Each tubular member 50 includes a plurality of openings 54 therein that align with some of the openings 22 on the splice plate 12. Bolts 40*a* connect one end of the splice plate 12 to one tubular member, and bolts 40*b* connect the other end of the splice plate 12 to the other tubular member, with each bolt extending through a respective one of the openings in the tubular member, then through a respective one of the openings of the splice plate and threaded into a respective one of the nuts.

To assembly each splice component, a U-shaped cover plate 18 of suitable length may be placed with bridging part 34 down in a jig, and the retaining plate 16 then placed within the U-shaped cover plate and welded in place. The nuts 14 are then placed in the retaining plate openings 36 and the splice plate is positioned on top (atop the free ends of the side support legs 30, 32) for welding in place. The jig would include suitable structures for assuring proper alignment of the components prior to welding.

Figure 4:
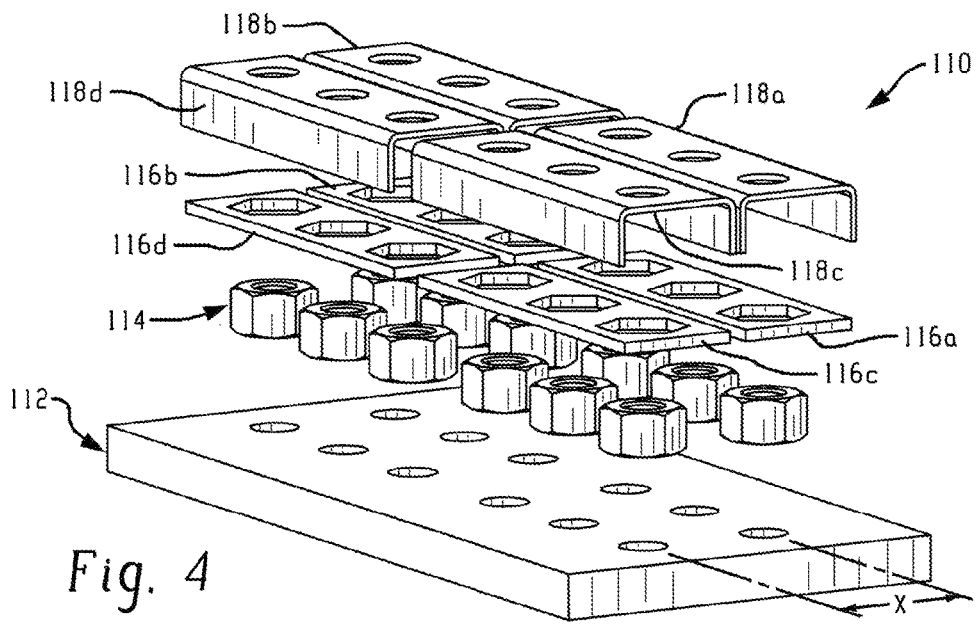
FIG. 4 is an exploded view of another embodiment of a splice component.
Figure 5:
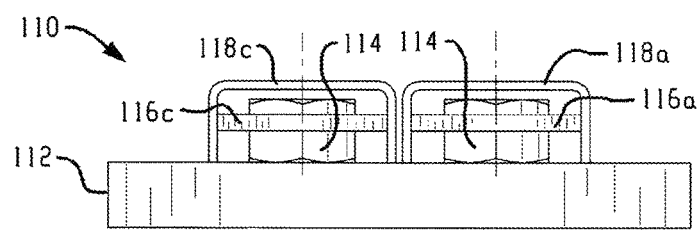
FIG. 5 is an end elevation of the splice component of FIG. 4 when assembled.
Figure 6:
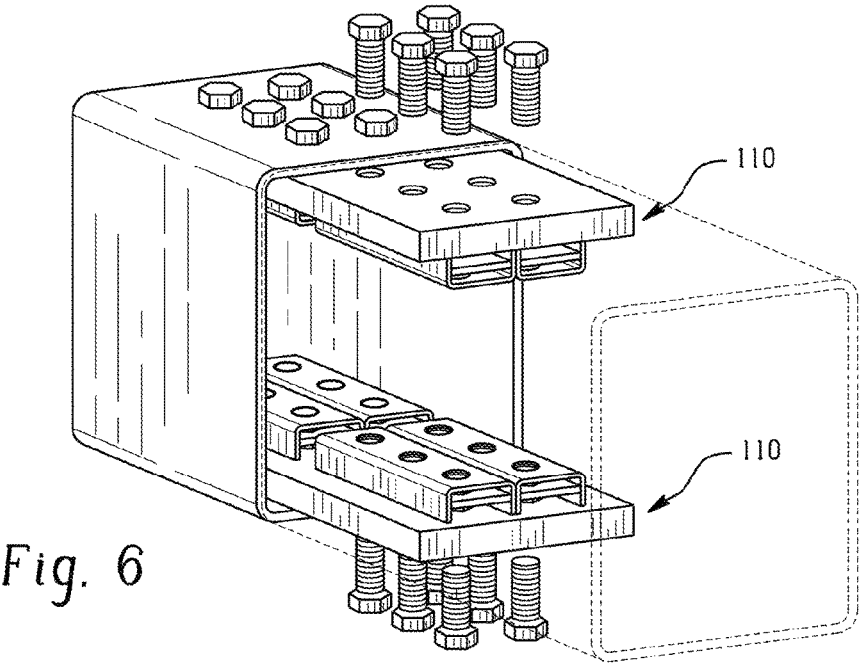
FIG. 6 is a partial perspective view of a tubular splice joint formed using the splice component of FIG. 4.

It is noted that use of the U-shaped cover plate 18 may provide benefits in terms of ease of assembly as well as efficiency of size. For example, a width $W_{NC}$ of the nut capture arrangement may be no more than three inches (e.g., less than three inches), which is particularly beneficial in the context of splice components that utilize more than one row of openings in the splice plate. For example, reference is made to the embodiment of FIGS. 4-6, where each splice component 110 is made up of splice plate 112, nuts 114, retaining plates 116*a*, 116*b*, 116*c* and 116*d*, and U-shaped cover plates 118*a*, 118*b*, 118*c* and 118*d*. Thus, two side-by-side nut capture arrangements are provided to align with the two side-by-side rows of openings in the splice plate. The center to center spacing X between the linear arrangements of openings 22 on such a splice plate may typically be about three inches, and therefore providing a nut capture arrangement that is capable of achieving side-by-side positioning at that narrow width is beneficial.

It is to be clearly understood that the above description is intended by way of illustration and example only, is not intended to be taken by way of limitation, and that other changes and modifications are possible.

What is claimed is:
1. A splice component for joining metal tubular members end to end, comprising:
 a splice plate having a linear arrangement of spaced apart openings extending along a length of the splice plate;

a plurality of nuts, each nut adjacent to and aligned with a respective one of the openings in the splice plate and loosely retained in place by a nut capture arrangement, the nut capture arrangement formed by:

at least one elongated U-shaped cover plate having spaced apart side support legs on opposite sides of the linear arrangement of spaced apart openings and a bridging part extending between the spaced apart side support legs and over the linear arrangement of spaced apart openings and the nuts aligned with the spaced apart openings, wherein each side support leg includes a free end that engages and is affixed to the splice plate;

at least one elongated retaining plate extending between and fixed to the spaced apart side support legs, the elongated retaining plate including a plurality of nut openings located therein, the elongated retaining plate positioned between the splice plate and the bridging part, the elongated retaining plate positioned at a location that is spaced apart from both the splice plate and the bridging part and along a thickness of the nuts such that each nut includes an intermediate portion within a respective one of the openings of the retaining plate, a first end portion to one side of the retaining plate and a second end portion to an opposite side of the retaining plate, wherein each nut and its respective opening are cooperatively configured to inhibit rotation of the nut within the opening while permitting some movement of the nut relative to its respective opening in the splice plate.

2. The splice component of claim 1 wherein the elongated U-shaped cover plate comprises a metal plate roll-formed into the U-shape so as to be a monolithic piece.

3. The splice component of claim 2 wherein a thickness of the elongated retaining plate is at least fifty percent greater than a thickness of a material of the U-shaped cover plate.

4. The splice component of claim 1 wherein a width of the nut capture arrangement is no more than three inches.

5. The splice component of claim 1 wherein a width of the nut capture arrangement is less than three inches.

6. The splice component of claim 1 wherein the bridging part includes a linear arrangement of spaced apart openings, each opening of the bridging part aligned with a respective one of the openings of the splice plate.

7. The splice component of claim 6, further comprising: a plurality of bolts, each bolt extending through a respective opening in the splice plate and threaded into the nut aligned with the respective opening.

8. The splice component of claim 7 wherein each bolt has a distal end that passes at least partially through a respective opening in the bridging part of the U-shaped cover plate.

9. The splice component of claim 1 wherein each side leg of the U-shaped cover plate is welded to the splice plate.

10. The splice component of claim 9 wherein the elongated retaining plate includes opposite sides, each side welded to a respective one of the side support legs of the U-shaped cover plate.

11. A tubular joint including the splice component of claim 1, further comprising:

a first tubular member having an open end and a second tubular member having an open end;

wherein a first portion of the splice component is positioned within the open end of the first tubular member with the splice plate adjacent an inner surface of the first tubular member;

wherein a second portion of the splice component is positioned with the open end of the second tubular member with the splice plate adjacent an inner surface of the second tubular member;

wherein the first tubular member includes a plurality of openings therein that align with a first multiplicity of the openings on the splice plate;

wherein the second tubular member includes a plurality of openings therein that align with a second multiplicity of the openings on the splice plate;

a first plurality of bolts, each bolt extending through a respective one of the openings in the first tubular member, then through a respective one of the openings of the first multiplicity and threaded into a respective one of the nuts;

a second plurality of bolts, each bolt extending through a respective one of the openings in the second tubular member, then through a respective one of the openings of the second multiplicity and threaded into a respective one of the nuts.

12. A splice component for joining metal tubular members end to end, comprising:

a splice plate having a linear arrangement of spaced apart openings extending along a length of the splice plate;

a plurality of nuts, each nut adjacent to and aligned with a respective one of the openings in the splice plate and loosely retained in place by a nut capture arrangement, the nut capture arrangement formed by:

at least one elongated U-shaped cover plate having spaced apart side support legs on opposite sides of the linear arrangement of spaced apart openings and a bridging part extending between the spaced apart side support legs and over the linear arrangement of spaced apart openings and the nuts aligned with the spaced apart openings, wherein each side support leg includes an end that engages and is affixed to the splice plate;

at least one elongated retaining plate extending between and fixed to the spaced apart side support legs, the elongated retaining plate including a plurality of nut openings located therein, the elongated retaining plate positioned at a location that is spaced apart from both the splice plate and the bridging part and along a thickness of the nuts such that each nut includes an intermediate portion within a respective one of the openings of the retaining plate, wherein each nut and its respective opening are cooperatively configured to inhibit rotation of the nut within the opening while permitting some movement of the nut relative to its respective opening in the splice plate.

13. The splice component of claim 12, wherein:

the splice plate includes a first linear arrangement of spaced apart openings and a second linear arrangement of spaced apart openings, the second linear arrangement running alongside and parallel to the first linear arrangement, the plurality of nuts includes a first set of nuts each of which is associated with a respective opening of the first linear arrangement, and a second set of nuts each of which is associated with a respective opening of the second linear arrangement, the nut capture arrangement includes a first elongated U-shaped cover plate having spaced apart side support legs on opposite sides of the first linear arrangement of spaced apart openings and a first bridging part extending between the spaced apart side support legs and over the first linear arrangement of spaced apart openings, and a second elongated U-shaped cover plate having spaced apart side support legs on opposite sides of the second linear arrangement of spaced apart openings and a second bridging part extending between the spaced apart side support legs and over the second linear arrangement of spaced apart openings, wherein each side support leg of the first elongated U-shaped cover plate includes a free end that engages and is affixed to the splice plate, and each side support leg of the second elongated U-shaped cover plate includes a free end that engages and is affixed to the splice plate.

14. The splice component of claim 12 wherein each nut includes a first end portion to one side of the retaining plate and a second end portion to an opposite side of the retaining plate.

15. A tubular joint including the splice component of claim 12, further comprising:
   a first tubular member having an open end and a second tubular member having an open end;
   wherein a first portion of the splice component is positioned within the open end of the first tubular member with the splice plate adjacent an inner surface of the first tubular member;
   wherein a second portion of the splice component is positioned with the open end of the second tubular member with the splice plate adjacent an inner surface of the second tubular member;
   wherein the first tubular member includes a plurality of openings therein that align with a first multiplicity of the openings on the splice plate;
   wherein the second tubular member includes a plurality of openings therein that align with a second multiplicity of the openings on the splice plate;
   a first plurality of bolts, each bolt extending through a respective one of the openings in the first tubular member, then through a respective one of the openings of the first multiplicity and threaded into a respective one of the nuts;
   a second plurality of bolts, each bolt extending through a respective one of the openings in the second tubular member, then through a respective one of the openings of the second multiplicity and threaded into a respective one of the nuts.

16. A splice component for joining metal tubular members end to end, comprising:
   a splice plate having a linear arrangement of spaced apart openings extending along a length of the splice plate;
   a plurality of nuts, each nut adjacent to and aligned with a respective one of the openings in the splice plate and loosely retained in place by a nut capture arrangement, the nut capture arrangement formed by at least one elongated U-shaped cover plate having spaced apart side support legs on opposite sides of the linear arrangement of spaced apart openings and a bridging part extending between the spaced apart side support legs and over the linear arrangement of spaced apart openings and over the nuts aligned with the spaced apart openings, wherein each side support leg includes an end that engages and is affixed to the splice plate; and
   at least one elongated retaining plate extending between and fixed to the spaced apart side support legs, the elongated retaining plate including a plurality of nut openings located therein, the elongated retaining plate positioned at a location that is spaced apart from both the splice plate and the bridging part and along a thickness of the nuts such that each nut includes an intermediate portion within a respective one of the openings of the retaining plate,
   wherein each nut and its respective opening are cooperatively configured to inhibit rotation of the nut within the opening while permitting some movement of the nut relative to its respective opening in the splice plate.

* * * * *